(12) United States Patent
Gattone et al.

(10) Patent No.: US 6,918,691 B2
(45) Date of Patent: Jul. 19, 2005

(54) HEADLAMP ADJUSTER

(75) Inventors: Michael T. Gattone, Tinley Park, IL (US); Adolph G. Galinski, Willowbrook, IL (US)

(73) Assignee: Illinois Tool Works Inc., Glenview, IL (US)

(*) Notice: Subject to any disclaimer, the term of this patent is extended or adjusted under 35 U.S.C. 154(b) by 151 days.

(21) Appl. No.: 10/600,248

(22) Filed: Jun. 20, 2003

(65) Prior Publication Data

US 2005/0078484 A1 Apr. 14, 2005

Related U.S. Application Data

(60) Provisional application No. 60/394,126, filed on Jul. 3, 2002.

(51) Int. Cl.[7] .............................................. F21W 101/10
(52) U.S. Cl. ....................... 362/515; 362/514; 362/324; 362/284
(58) Field of Search ................................. 362/514, 515, 362/324, 284

(56) References Cited

U.S. PATENT DOCUMENTS

| | | | | |
|---|---|---|---|---|
| 5,381,317 A | * | 1/1995 | Schmitt et al. | 362/515 |
| 6,036,341 A | * | 3/2000 | Dobler et al. | 362/524 |
| 6,481,879 B1 | * | 11/2002 | Shirai et al. | 362/514 |
| 6,773,153 B2 | * | 8/2004 | Burton | 362/528 |
| 2001/0030875 A1 | * | 10/2001 | Denley | |
| 2003/0169597 A1 | * | 9/2003 | Tanaka et al. | |

* cited by examiner

*Primary Examiner*—Laura K. Tso
(74) *Attorney, Agent, or Firm*—Mark W. Croll; Paul F. Donovan

(57) ABSTRACT

A headlamp adjuster and a headlamp adjustment assembly having a housing, a shaft axially moveable in the housing and a gear having a thread engaging a thread of the shaft for causing axial movement of the shaft from rotation of the gear. The gear and/or housing are adapted to receive rotary input tools for adjustment. All parts can be made of plastic or other non-corrosive materials.

18 Claims, 3 Drawing Sheets

HEADLAMP ADJUSTER

CROSS-REFERENCE TO RELATED APPLICATIONS

This Non-Provisional Application claims benefit to U.S. Provisional Application Ser. No. 60/394,126, filed Jul. 3, 2002.

FIELD OF THE INVENTION

The present invention relates to right angle adjustment mechanisms and, more particularly, the invention relates to adjuster mechanisms useful for adjusting the aim of headlights found in various motor vehicles.

BACKGROUND OF THE INVENTION

Headlamps on motor vehicles require proper aiming, both vertically and horizontally, for safe and optimal performance. From time-to-time, it is necessary to readjust the aim of vehicle headlamps. If the headlamp is not properly adjusted vertically, the headlamp may focus the light too close to the vehicle, not adequately lighting the distance. If the field of light is too short, objects might not be illuminated soon enough for a driver to react to the presence of the object, even if the vehicle is being operated within legal speed limits. Conversely, if the headlamp is aimed to focus too far in the distance, the area in front of the vehicle may not be properly illuminated for adequate recognition of something in front of the vehicle. Further, a headlamp aimed too distant may "blind" an oncoming driver even in the dimmed or "low-beam" condition.

Proper horizontal adjustment is just as important as proper vertical adjustment. If the headlamp is aimed to direct the beam of light too far to the left, oncoming drivers can be blinded. If focused too far to the right, the primary field directly in front of the automobile may not be properly illuminated. Improperly directed headlamps can be distracting and unsafe.

Many different adjustment assemblies have been used for automobile headlamps, some used more successfully than others. Commonly, such adjustment mechanisms are component style systems having individual components requiring assembly at the time of installation. Such systems may utilize insert molding technology or stamping technology. In one known system, a cold headed screw is provided with an O-ring and a metal push nut. To assemble the system, the O-ring is pushed onto the shaft of the screw, and then the screw/O-ring assembly is positioned through a hole in a headlamp housing panel. Thereafter, the push nut is pushed up the screw shaft until it is positioned snuggly against the opposite side of the housing panel, thereby securing the assembly to the panel. A rectangular grommet is placed or snapped into a rectangular hole in a reflector. The screw is threaded into the grommet to establish a preset distance between the headlamp housing panel and reflector. To adjust the position of the reflector, the head of the screw is rotated, typically with a Phillips screw driver. The reflector is pivotally mounted so as to be able to move in the vertical and/or horizontal plane when the adjuster is utilized. Although adjusters of this type have proven to be useful, because of the many individual components required, labor requirements for assembly and installation are high.

Thus, there is a need in the art for an improved headlamp adjuster mechanism that can be provided to an assembly line in a pre-assembled condition and which installs to a vehicle quickly and easily with a minimal amount of labor.

SUMMARY OF THE INVENTION

The present invention provides a headlamp adjuster that is provided in a pre-assembled condition and requires only push-in, snap connection or minimal rotation to lock the adjuster in position on a headlamp.

In one aspect thereof, the present invention provides a headlamp adjustment assembly with a headlamp panel and a housing secured to the headlamp panel. A shaft extends through the housing. The shaft has an end for engaging a headlamp reflector and a screw thread provided along at least a portion of a length of the shaft. An adjustment gear is disposed rotatably on the shaft and in the housing, the gear defining a hole therethrough with a thread therein engaging the screw thread of the shaft. The gear is in a substantial axially fixed and rotatable position in the housing, whereby rotation of the gear causes axial movement of the shaft relative to the gear and the housing. The adjustment gear is adapted for rotation by a rotary input device drivingly coupled with the adjustment gear.

In another aspect thereof, the present invention provides a headlamp adjuster with a housing and a shaft extending through the housing. The shaft has an end for engaging a headlamp reflector and a screw thread provided along at least a portion of a length of the shaft. An adjustment gear is disposed rotatably on the shaft and in the housing. The gear defines a hole therethrough with a thread therein engaging the screw thread of the shaft. The gear is in a substantial axially fixed and rotatable position in the housing, whereby rotation of the gear causes axial movement of the shaft relative to the gear and the housing. The adjustment gear is adapted for rotation by a rotary input device drivingly coupled with the adjustment gear.

In still another form thereof, the present invention provides a headlamp adjustment device with a housing and a shaft extending through the housing. The shaft has an end for engaging a headlamp reflector and a thread provided along at least a portion of a length of the shaft. An adjustment gear is disposed rotatably on the shaft and in the housing. The gear defines a hole therethrough with a thread therein engaging the thread of the shaft. The gear is in a substantial axially fixed and rotatable position in the housing, whereby rotation of the gear causes axial movement of the shaft relative to the gear and the housing. The adjustment gear is adapted for coupling to two different rotary tools for selectively rotating the adjustment gear with a selected one of the tools.

An advantage of the present invention is providing a headlamp adjuster mechanism as a pre-assembled component that requires minimal labor to install in a vehicle.

Another advantage of the present invention is providing a headlamp adjuster that can be made entirely of plastic or other non-corrosive materials.

Still another advantage of the present invention is providing a headlamp adjuster that can be operated with a variety of different tools.

Other features and advantages of the invention will become apparent to those skilled in the art upon review of the following detailed description, claims and drawings in which like numerals are used to designate like features.

Figure 1:
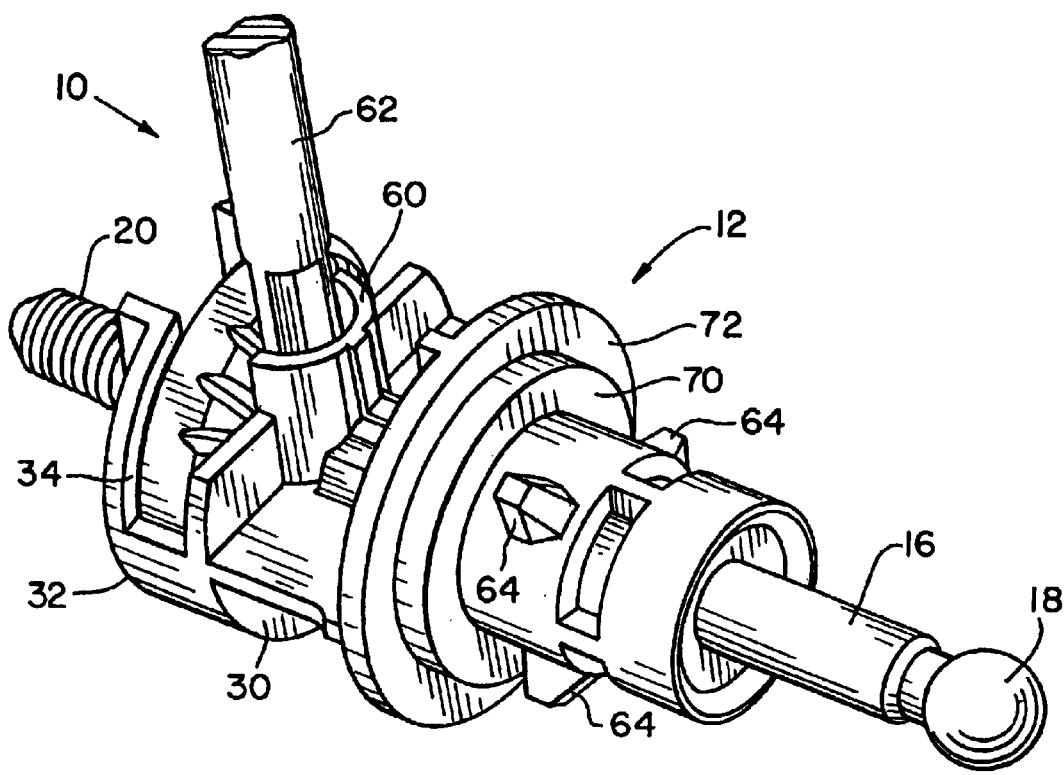
FIG. 1 is a perspective view of a headlamp adjuster in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including" and "comprising" and variations thereof is meant to encompass the items listed thereafter and equivalents thereof, as well as additional items and equivalents thereof.

DETAILED DESCRIPTION OF THE PREFERRED EMBODIMENT

Figure 6:
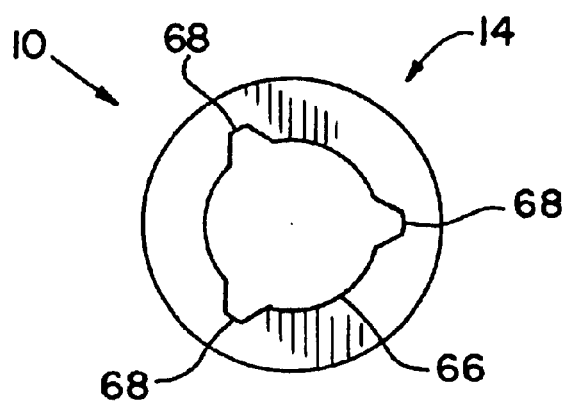
FIG. 6 is a plan view of a headlamp panel used with the adjuster shown in the previous drawings.

Referring now and more specifically to the drawings and to FIG. 1 in particular, numeral 10 designates a headlamp adjuster assembly which includes headlamp adjuster 12 and headlamp panel 14 (FIG. 6) in accordance with the present invention. Advantageously, headlamp adjuster 12 can be made of plastic or, alternatively, of other non-corrosive materials such as zinc, stainless steel or the like. As a further alternative, inexpensive metals also can be used for some or all of the components to be described hereinafter. Headlamp adjuster 12 is secured in panel 14 as will be described subsequently herein.

Headlamp adjuster 12 includes a shaft 16 adapted for operatively engaging a headlamp reflector (not shown). Those skilled in the art will readily recognize and understand how such operative connection can be made using a bulbous end 18 of shaft 16 secured in a cup (not shown) of the reflector (not shown). The reflector (not shown) is connected to the vehicle about pivot points to pivot in vertical and/or horizontal planes, depending on the position and operation of one or more headlamp adjusters 12.

Shaft 16 further includes a thread or plurality of grooves 20 extending along at least a portion of the axial length thereof. Threads 20 can be continuous or discontinuous screw-type threads surrounding shaft 16. More advantageously, flats 22, such as those shown in FIG. 5, can be provided on opposite sides of shaft 16 such that shaft 16 is held rotationally stable about its longitudinal axis during the operation thereof, as will be described subsequently herein.

Headlamp adjuster 12 further includes a housing 30 through which shaft 16 extends. An inner portion of housing 30 includes mating flats for positionally receiving shaft 16 such that flats 22 of shaft 16 are received against the flats of housing 30. Housing 30 further defines a receiver 32 including a slot 34 and a cup 36 each having openings thereto from a same direction.

Headlamp adjuster 12 further includes an adjustment gear 40 held in housing 30 for rotation therein. Adjustment gear 40 includes a collar 42 having threads 44 therein for engaging threads 20 of shaft 16. Gear 40 further includes a head 46 connected to and preferably integral with collar 42. Head 46 has teeth 48 on a face thereof. Gear 40 is positioned in receiver 32, for rotation therein. Collar 42 is received in cup 36 of receiver 32, and head 46 is received in slot 34 of receiver 32.

Housing 30 further defines a well 60 adjacent slot 34 and confronting head 46. A segment of teeth 48 are thereby exposed in well 60. Alternatively, well 60 could be formed in other associated components of the headlamp assembly, provided that the teeth 48 are exposed in the well. Well 60 and teeth 48, along head 46, are configured to receive a rotary input device 62. Device 62 can be in the nature of a rotary tool such as a Phillips screwdriver, or a hex-tool or the like that will drivingly engage with teeth 48 of adjustment gear 40.

Housing 30 is secured to panel 14 by way of a plurality of locking tabs 64. Panel 14 (FIG. 6) is configured with a hole 66 therein for receiving a portion of housing 30 therethrough. A plurality of cutouts 68 in the periphery of hole 66 are configured and arranged to receive locking tabs 64 therethrough. Cutouts 68 and locking tabs 64 can be of various shapes and sizes, so long as one cooperates with the other. Once locking tabs 64 are inserted through cutouts 68, a slight rotation of housing 30 misaligns cutouts 68 and locking tabs 64, thereby securing housing 30 in panel 14. A gasket 70 against a flange 72 of housing 30 are provided to create a tight seal between housing 30 and headlamp panel 14. Thus, headlamp adjuster 12 is easily attached to panel 14 without the need for tools or the like, although tools can be utilized if so desired.

Figure 2:
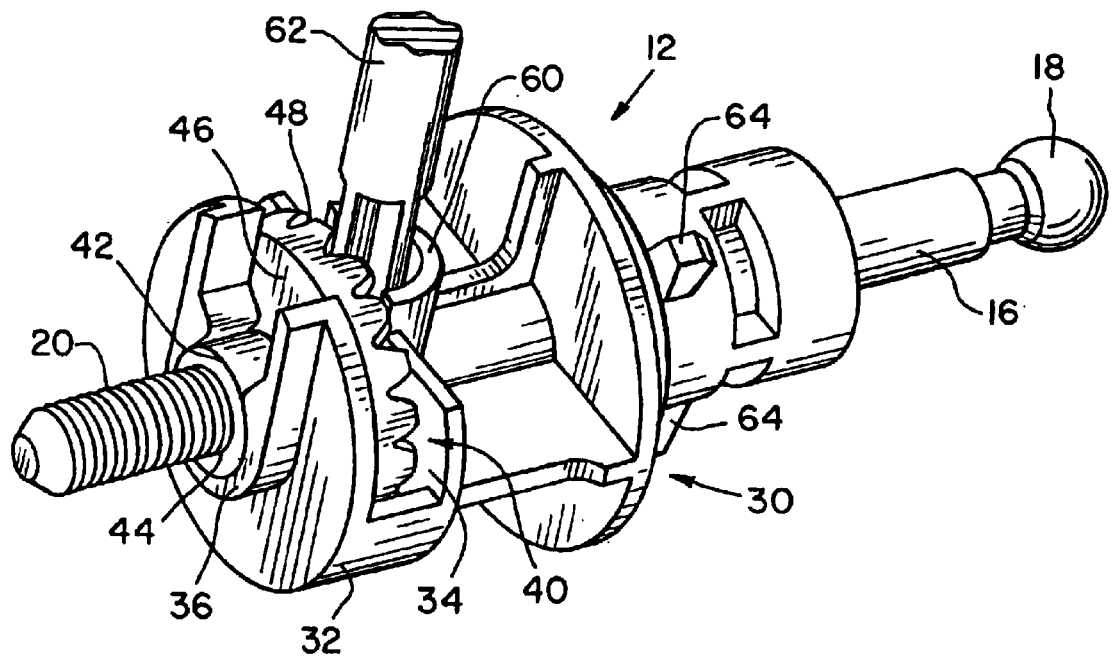
FIG. 2 is a perspective view of the headlamp adjuster shown in FIG. 1, the view shown in FIG. 2 being from an angle different from that of FIG. 1.

In the embodiment illustrated in FIGS. 1 and 2, when adjustment is required, rotary input device 62 is inserted into well 60, and is placed in driving engagement with teeth 48 exposed in well 60. Since rotary input device 62 is engaged with teeth 48 of gear 40, rotation of device 62 causes rotation of adjustment gear 40. As adjustment gear 40 is rotated, threads 44 of gear 40 rotate in engagement with threads 20 of shaft 16. Since adjustment gear 40 is in an axially fixed position, shaft 16 is thereby caused to move axially relative to housing 30. Bulbous end 18 of shaft 16 thereby moves away from or closer to housing 30, depending on the direction of rotation of adjustment gear 40. As shaft 16 is moved axially, a reflector (not shown) connected to bulbous end 18 moves therewith, pivoting about pivotal connections thereof, as those skilled in the art will readily understand.

Figure 3:
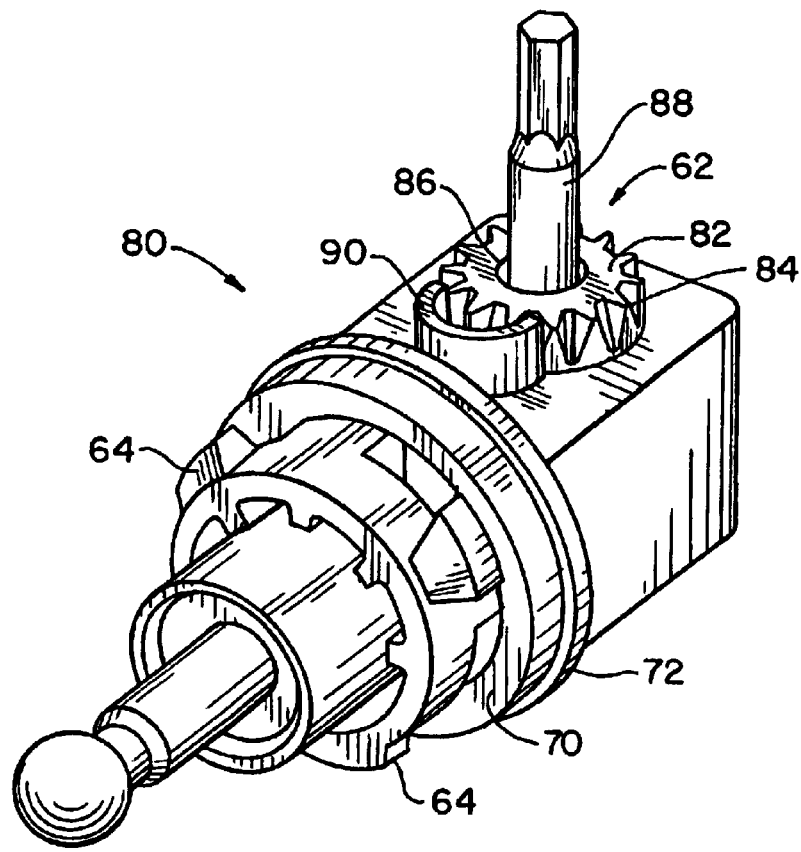
FIG. 3 is a perspective view of a second embodiment of a headlamp adjuster in accordance with the present invention.
Figure 4:
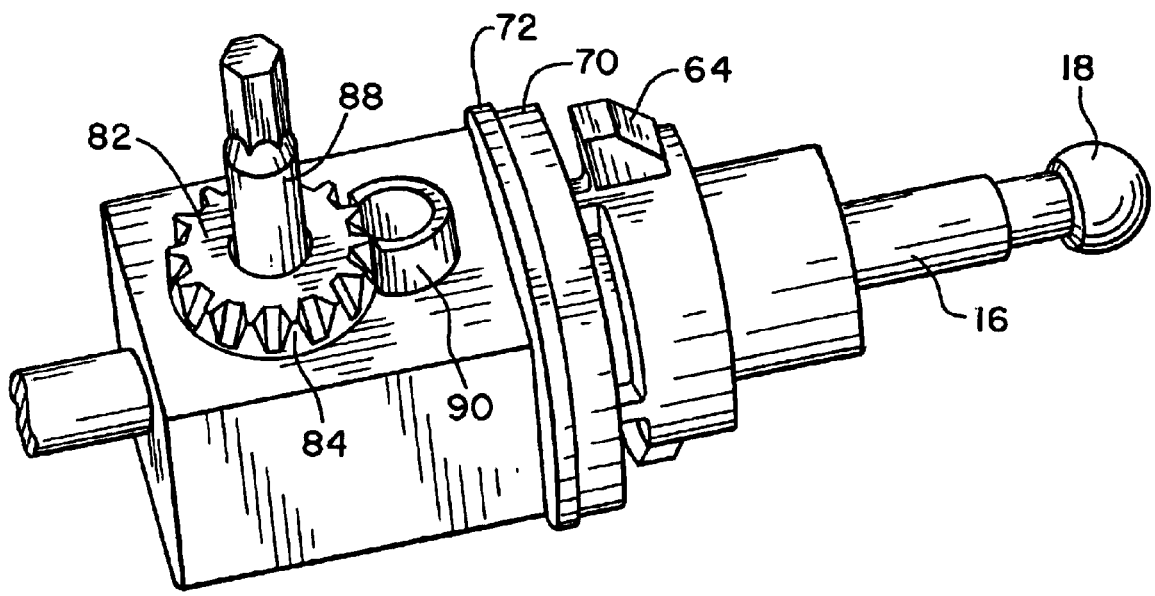
FIG. 4 is a perspective view of the headlamp adjuster shown in FIG. 3 taken from an angle different from that of FIG. 3.
Figure 5:
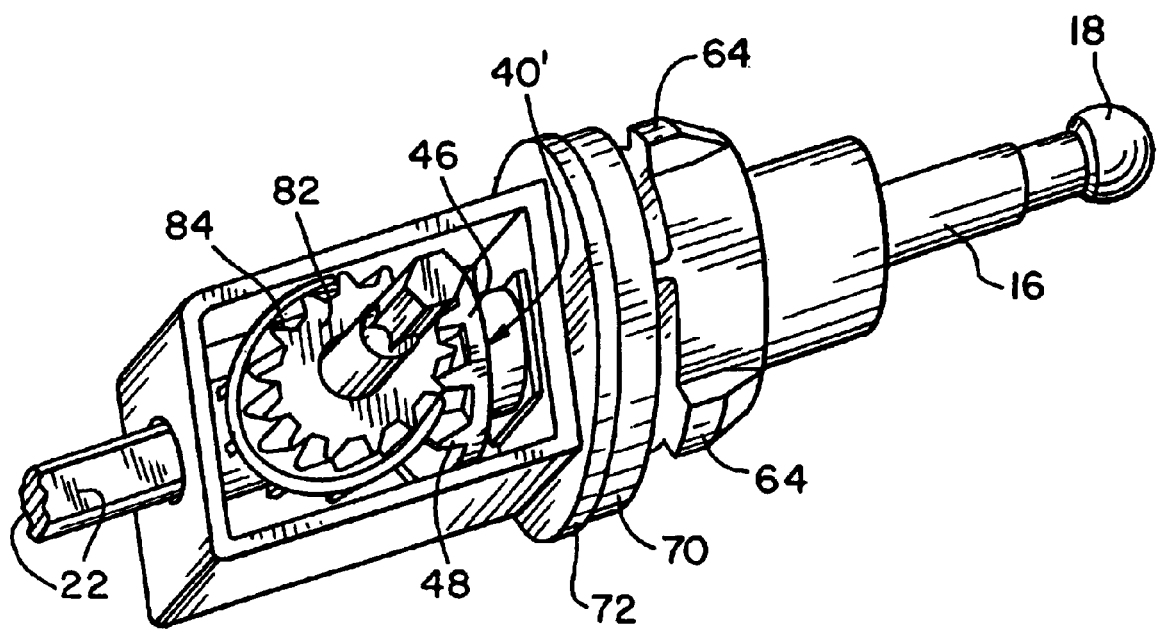
FIG. 5 is a perspective view from the top of the headlamp adjuster shown in FIGS. 3 and 4.

A further embodiment of the present invention is shown in FIGS. 3, 4 and 5. Headlamp adjuster 80 shown therein is similar to headlamp adjuster 12, and like components are indicated with similar numerals. However, in headlamp adjuster 80 rotary input device 62 includes a drive gear 82, having teeth 84 thereof in driving engagement with adjustment gear 40'. Drive gear 82 has an axial opening 86 configured to receive a rotary input tool 88, such as a screwdriver, hex drive tool or the like. The input tool 88 may be a fixed piece in the headlamp assembly if so desired. Adjuster 80 further includes a well 90 associated with teeth 84 on drive gear 82 to receive a rotary input tool 88 of another type, so that adjuster 80 can be operated by two different tools 88, such as a screwdriver and a hex tool. When adjustment is required, one of the proper rotary input tools 88 is inserted into opening 86 or well 90 and is turned. Drive gear 82 is thereby rotated by rotary input tool 88, and as drive gear 82 rotates, the engagement between gear 82 and adjustment gear 40 causes rotation of adjustment gear 40 in conjunction with rotation of drive gear 82. Shaft 16 is thereby caused to move axially in housing 30, as described previously herein.

The present invention provides a headlamp adjuster that can be secured quickly and easily in an automobile without the need for additional components or tools. The adjustment device can be made up of non-corrosive materials including plastic and can be manufactured and installed inexpensively. The adjuster can be removed for servicing or replacement of headlamp components. Advantageously, a variety of different rotary input tools can be used in conjunction herewith, even in conjunction with the same assembly.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A headlamp adjustment assembly, comprising
   a headlamp panel;
   a housing secured to said headlamp panel;
   a shaft extending through said housing, said shaft having an end and a screw thread provided along at least a portion of a length of said shaft;
   an adjustment gear disposed rotatably on said shaft and in said housing, said gear defining a hole therethrough with a thread therein directly engaging said screw thread of said shaft, said gear being in a substantial axially fixed and rotatable position in said housing, whereby rotation of said gear causes axial movement of said shaft relative to said gear and said housing, said adjustment gear adapted for rotation by a rotary input device drivingly coupled with said adjustment gear; and
   said housing defined a well adjacent said adjustment gear, with a portion of said gear exposed in said well, said well and said gear configured to receive said rotary input device in driving engagement with said gear.

2. The adjustment assembly of claim 1, said well and said gear adapted for receiving a screwdriver as said rotary input device.

3. The adjustment assembly of claim 1, said well and said gear adapted to receive a hex drive tool as said rotary input device.

4. The adjustment assembly of claim 1, said rotary input device comprising a drive gear in driving engagement with said adjustment gear, said drive gear adapted for engaging a rotary input tool.

5. The adjustment assembly of claim 4, said drive gear adapted for receiving a screw driver as said rotary input tool.

6. The adjustment assembly of claim 4, said drive gear adapted for receiving a hex tool as said tool as input tool.

7. The adjustment assembly of claim 6, said drive gear adapted for receiving a screw driver as said rotary input tool.

8. The adjustment assembly of claim 1, said panel defining a hole for receiving said housing therein.

9. The adjustment assembly of claim 8, said hole defined in said panel having cutouts at the perimeter thereof, and said housing having tabs arranged to pass only through said cut outs, said tabs disposed in spaced relation to a flange of said housing larger than said hole defined in said panel.

10. The adjustment assembly of claim 1, said housing said shaft and said adjustment gear made of plastic.

11. A headlamp adjuster, comprising:
    a housing;
    a shaft extending through said housing, said shaft having an end and a screw thread provided along at least a portion of a length of said shaft;
    an adjustment gear disposed rotatably on said shaft and in said housing, said gear defining a hole therethrough with a thread therein directly engaging said screw thread of said shaft, said gear being in a substantial axially fixed and rotatable position in said housing, whereby rotation of said gear causes axial movement of said shaft relative to said gear and said housing, said adjustment gear adapted for rotation by a rotary input device drivingly coupled with said adjustment gear; and
    said housing defining a well adjacent said adjustment gear, with a portion of said gear exposed in said well, and said gear configured to receive said rotary input device in driving engagement with said gear.

12. The headlamp adjuster of claim 11, said well and said gear adapted for receiving a screw driver as said rotary input device.

13. The headlamp adjuster of claim 11, said well and said gear adapted to receive a hex tool as said rotary input device.

14. The headlamp adjuster of claim 11, said rotary input device comprising a drive gear in driving engagement with said adjustment gear, said drive gear adapted for engaging a rotary input tool.

15. The headlamp adjuster of claim 14, said drive gear adapted for receiving a screw driver as said rotary input tool.

16. The headlamp adjuster of claim 14, said drive gear adapted for receiving a hex tool as said rotary input tool.

17. The headlamp adjuster of claim 16, said drive gear adapted for receiving a screw driver as said rotary input tool.

18. A vehicle headlamp adjustment device, comprising:
    a housing;
    a shaft extending through said housing, said shaft having an end and a thread provided along at least a portion of a length of said shaft; and
    an adjustment gear disposed rotatably on said shaft and in said housing;
    said gear defining a hole therethrough with a thread therein directly engaging said thread of said shaft;
    said gear being in a substantial axially fixed and rotatable position in said housing, whereby rotation of said gear causes axial movement of said shaft relative to said gear and said housing; and
    said adjustment gear adapted for coupling to two different rotary tools for selectively rotating said adjustment gear with a selected one of the tools.

* * * * *